United States Patent
Lin et al.

(10) Patent No.: US 7,450,372 B2
(45) Date of Patent: Nov. 11, 2008

(54) HANGING AND DESKTOP DUAL-PURPOSE COMPUTER DEVICE

(75) Inventors: Yu-Chi Lin, Taipei (TW); Shih-Hsuan Wang, Taipei (TW)

(73) Assignee: Inventec Corporation, Taipei (TW)

( * ) Notice: Subject to any disclaimer, the term of this patent is extended or adjusted under 35 U.S.C. 154(b) by 350 days.

(21) Appl. No.: 11/330,243

(22) Filed: Jan. 12, 2006

(65) Prior Publication Data

US 2007/0159778 A1    Jul. 12, 2007

(51) Int. Cl.
*H05K 5/00* (2006.01)
*H05K 7/00* (2006.01)

(52) U.S. Cl. .................... 361/683; 361/681; 710/303; 710/304

(58) Field of Classification Search ............... 361/679, 361/681, 683, 686; 710/303, 304
See application file for complete search history.

(56) References Cited

U.S. PATENT DOCUMENTS

| | | | | |
|---|---|---|---|---|
| 3,924,775 | A * | 12/1975 | Andreaggi et al. | 220/756 |
| 4,081,119 | A * | 3/1978 | Messmore | 206/454 |
| 5,235,495 | A * | 8/1993 | Blair et al. | 361/680 |
| 5,351,508 | A * | 10/1994 | Kelley | 70/58 |
| 5,375,076 | A * | 12/1994 | Goodrich et al. | 361/681 |
| 5,396,399 | A * | 3/1995 | Blair et al. | 361/681 |
| 6,016,248 | A * | 1/2000 | Anzai et al. | 361/683 |
| 6,301,101 | B1 * | 10/2001 | Anzai et al. | 361/683 |
| 6,636,420 | B2 * | 10/2003 | Nakano et al. | 361/682 |
| 6,651,943 | B2 * | 11/2003 | Cho et al. | 248/122.1 |
| 6,665,176 | B2 * | 12/2003 | Amemiya et al. | 361/681 |
| 6,807,050 | B1 * | 10/2004 | Whitehorn et al. | 361/681 |
| 7,106,578 | B2 * | 9/2006 | Chen | 361/681 |
| 7,143,478 | B2 * | 12/2006 | Quijano | 16/445 |
| 7,298,610 | B2 * | 11/2007 | Kim et al. | 361/683 |
| 7,299,580 | B2 * | 11/2007 | Wang et al. | 40/719 |
| 2003/0025063 | A1 * | 2/2003 | Chen et al. | 248/918 |
| 2004/0096053 | A1 * | 5/2004 | Francke et al. | 379/428.04 |
| 2006/0050471 | A1 * | 3/2006 | Chen | 361/681 |
| 2006/0077623 | A1 * | 4/2006 | Yeh | 361/681 |
| 2006/0082957 | A1 * | 4/2006 | Chen | 361/681 |
| 2007/0199844 | A1 * | 8/2007 | Daley | 206/320 |
| 2007/0201201 | A1 * | 8/2007 | Daley | 361/683 |

* cited by examiner

*Primary Examiner*—Jayprakash N Gandhi
*Assistant Examiner*—Anthony M Haughton
(74) *Attorney, Agent, or Firm*—Bacon & Thomas, PLLC

(57) ABSTRACT

A hanging and desktop dual-purpose compute device comprises a main body having a display, a lifting handle, and an input device. The main body includes a groove at an end of the main body for accommodating the input device, and two corresponding sides of the lifting handle are pivotally coupled to the main body, and each side includes a pivoting portion, such that the lifting handle can be rotated for hanging the main body. The pivoting portion includes a resilient member, such that when the lifting handle is rotated towards a side of the main body opposite to a display screen and tilted to a specific inclination with a side of the main body to support the main body on a flat surface, the resilient member can balance the main body, and the main body will not tilted to any disposing direction.

8 Claims, 4 Drawing Sheets

HANGING AND DESKTOP DUAL-PURPOSE COMPUTER DEVICE

FIELD OF THE INVENTION

The present invention relates to a computer device, and more particularly to a hanging and desktop dual-purpose computer device that can be hanged on a wall or placed on the top of a table.

BACKGROUND OF THE INVENTION

Since the electronic and information industry is blooming, various different multimedia products are introduced to the market. To provide more choices for our recreation and leisure activities, technologies related to the aforementioned products are developed, and thus it is a concern to consumers whether or not the practicability and convenience of an electronic product can actually meet the user requirements or a concern to manufacturers whether or not these products comply with the purposes of making profits and saving costs.

At present, the price of liquid crystal display products gradually become reasonable as LCD products are widely acceptable to users, since LCD products come with a thin and compact design. Compared with traditional computer cathode ray tube (CRT) monitors, the liquid crystal displays occupy less space and provide a more artistic appearance, so that the liquid crystal displays are used extensively by consumers. Therefore, LCD becomes the first choice for the display interface of computers and televisions, etc, and marketing information indicates that the world's major electronic appliance manufacturers intend to manufacture LCD TV as their main product, and LCD will become another popular product after the introduction of the popular DVD products.

Most desktop computer devices come with a display placed and used on the top of a table or a desk, and users seldom question about such arrangement. However, there is a situation that a user needs not to do work such as word processing with the computer device, but the user wants to use the computer device in the multimedia application, such as an application for the audio/video recreation purpose. For users at home, a user can play audio/video files for recreation at an area restricted to where the computer device is situated only. If the user no longer stays in that area, the performance of playing the audio/video files for recreation will be lowered. On the other hand, it is very convenient if a personal digital assistant (PDA) or notebook computer and its display can be moved to where the user is situated, while maintaining the desktop function and providing a viewing screen.

However, the place where the user is situated may not have a flat surface for placing a computer device, and thus finding a way to overcome the problem of placing a computer device as well as moving the computer device anywhere by developing and providing a hanging and desktop dual computer device is a subject that demands immediate attentions and solutions.

SUMMARY OF THE INVENTION

In view of the shortcomings of the prior art, the inventor of the present invention tried to overcome the shortcomings of the prior art, of which the desktop computer device and its display can be placed at a position for disposing computers only, but these devices cannot maintain their operating functions and viewing screen while the devices are moved to where the user is situated. In the meantime, the inventor also has to overcome the problem of installing the computer at a place without a flat surface. The inventor based on years of experience to conduct extensive researches and experiments, and finally invented a hanging and desktop dual-purpose computer device.

Therefore, it is a primary objective of the present invention to provide a hanging and desktop dual-purpose computer device that comprises a main body having a display, a lifting handle, and an input device. The main body includes a groove at an end of the main body for accommodating the input device, and the corresponding sides of the lifting handle are pivotally coupled to the main body, and each side of the lifting handle includes a pivoting portion, such that the lifting handle can be rotated at both ends of the main body for hanging the main body. The pivoting portion includes a resilient member therein, such that when the lifting handle is rotated towards a side of the main body opposite to a display screen and tilted to a specific inclination with a side of the main body to support the main body on a flat surface, the resilient member can balance the main body, so that the main body will not tilted to any disposing direction.

Another objective of the present invention is to install a disposing slot on a side of the main body opposite to the display screen and at an end away from the lifting handle, and both walls of the disposing slot include a board for gripping the main body, so that the board can be movably rotated into the disposing slot and contained therein.

A further objective of the present invention is to install at least one detecting device at a side of the main body facing the supporting plate, and the detecting device can detect whether or not the lifting handle is in the state of hanging the main body according to the detection of the supporting plate. If the detecting device detects the supporting plate, the detecting device will turn on an image converting device in the main body to turn the angle of the image of the screen display upside down. If the detecting device detects no supporting plate, the image converting device will maintain the angle of the original image of the screen display.

The above and other objects, features and advantages of the present invention will become apparent from the following detailed description taken with the accompanying drawings.

DETAILED DESCRIPTION OF THE PREFERRED EMBODIMENTS

Figure 1:
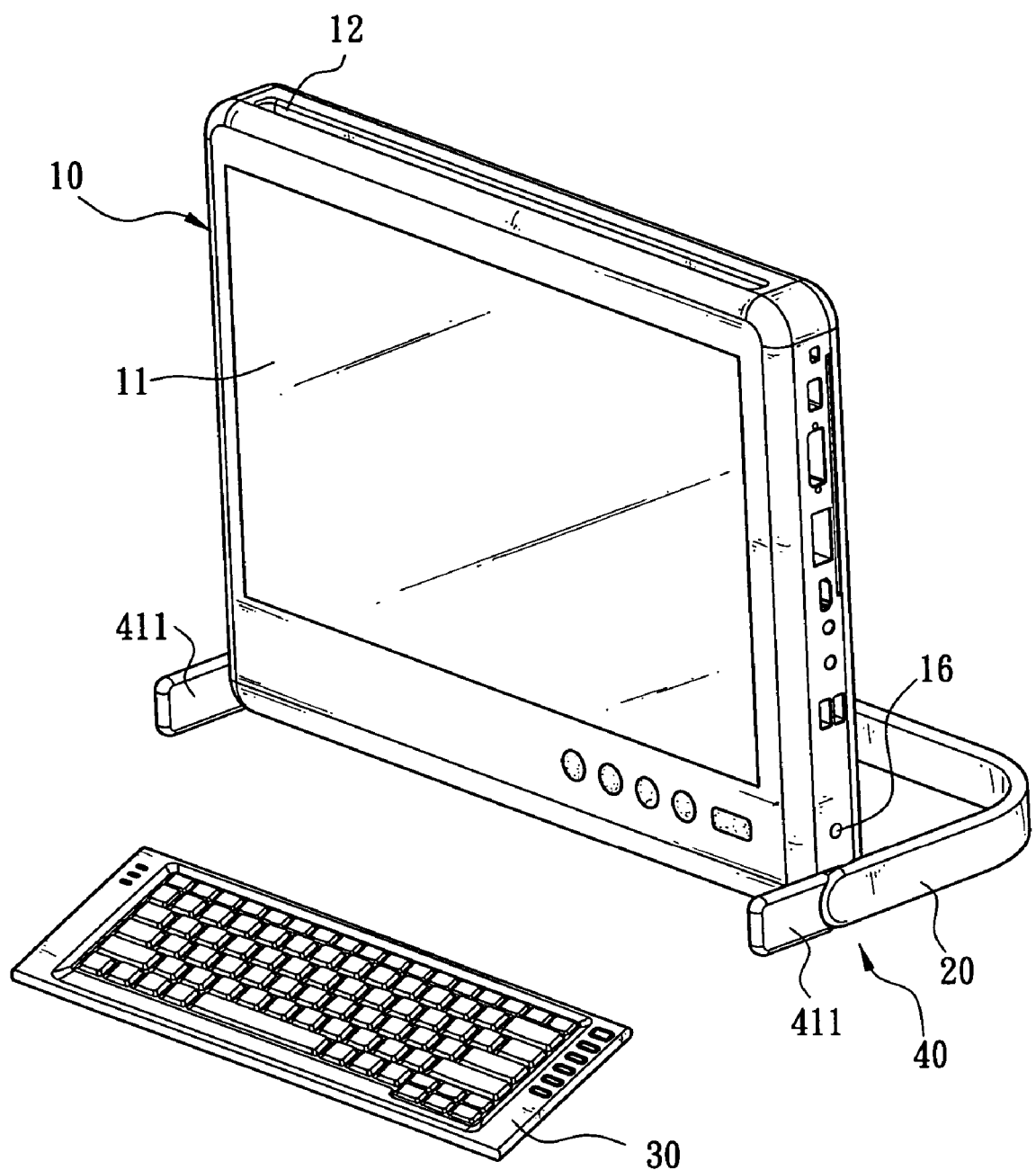
FIG. 1 is a schematic view of a preferred embodiment of the present invention.
Figure 3:
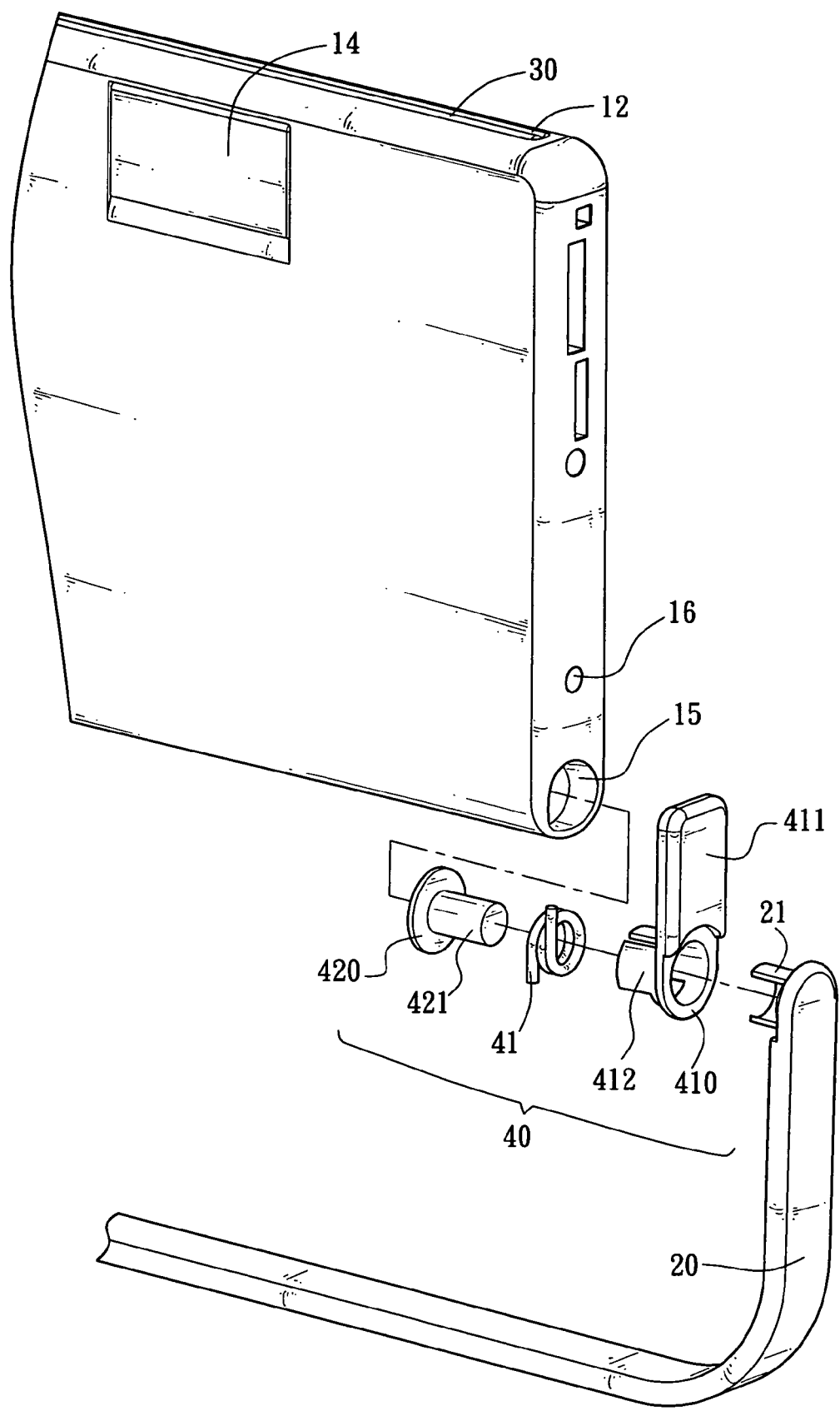
FIG. 3 is an exploded view of a pivotal connecting portion of the present invention.

Referring to FIGS. 1 and 3 for a preferred embodiment of the present invention, a hanging and desktop dual-purpose computer device comprises a main body 10 (such as table PC), a lifting handle 20 (such as a U-shape lifting handle), and an input device 30 (such as a wireless keyboard). The main body 10 includes a display screen 11 disposed on one side and a groove 12 disposed on a surface for containing the input device 30 in the main body 10. The main body 10 also includes a pivoting portion 40 disposed separately on both corresponding sides, and the two pivoting portions 40 are pivotally coupled to both ends of the lifting handle 20, such that the lifting handle 20 can be rotated on both ends of the main body 10 for hanging the main body 10 (as shown in FIG.

Figure 4:
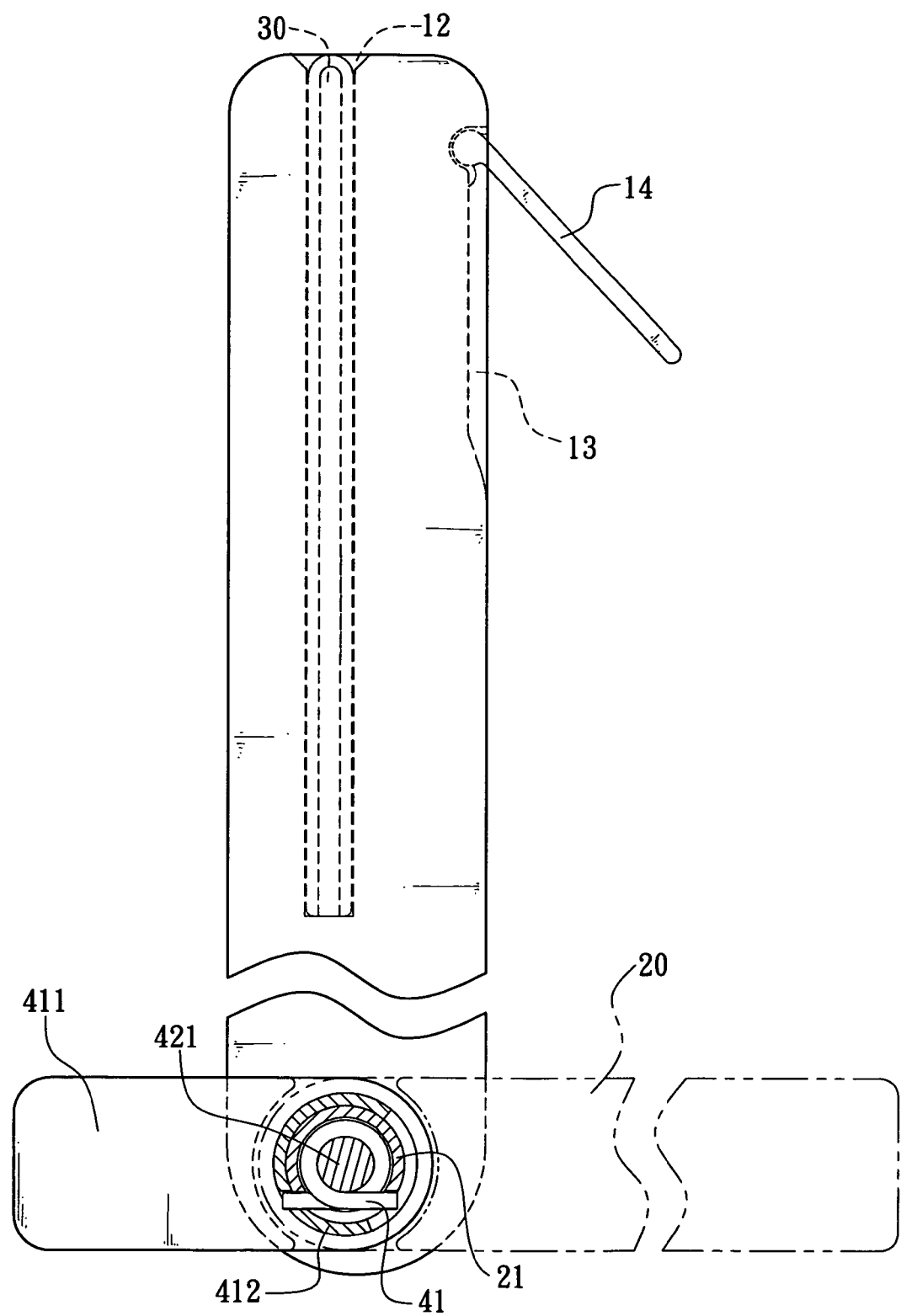
FIG. 4 is a side view of the present invention.

2), and any one of the pivoting portions 40 includes a resilient member 41 therein. Refer to FIGS. 1 and 4. If the lifting handle 20 is rotated towards to a side of the main body 10 other than the side having the display screen 11 and a lateral side of the main body 10 is tilted to a specific inclination to support the main body 10 on a flat surface, the resilience of the resilient member 41 will be able to balance the main body 10, such that the main body 10 will not be toppled to any disposing direction. If the lifting handle 20 is rotated back to the state of hanging the main body 10, any one of the pivoting portions 40 will be rotated to eliminate the resilience, and the computer device will be able to sit still on the top of a desk, or hanged on a wall when there is no flat surface available.

In FIGS. 1 and 3, the pivoting portion 40 further comprises a hollow first axle 410, a second axle 420 and an Ω-shape resilient member 41, and the first axle 410 is coupled to an end of the lifting handle 20, and an end of the first axle 410 includes an outwardly extended supporting plate 411, and the hollow circumferential edge of the first axle 410 facing the main body 10 includes a hollow flange 412, and an end of the second axle 420 is coupled to a depressed hole 15 of the main body 10, and another end of the second axle 420 includes a protruding axle 421 passing through the resilient member 41 and being fixed into the hollow flange 412, so that the second axle 420 is coupled to the first axle 410; wherein an end of the resilient member 41 presses against a protruded connecting edge 21 of the lifting handle 20, and another end of the resilient member 41 presses against the hollow flange 412. If the main body 10 and the lifting handle 20 are rotated to support the main body 10 on a flat surface by the lifting handle 20, the resilience at both ends of the resilient member 41 will be exerted onto the protruded connecting edge 21 and the hollow flange 412, such that the main body 10 is supported by the supporting plate 411 and the lifting handle 20 and thus the main body 10 will not be toppled towards the supporting plate 411 or the lifting handle 20.

In FIGS. 1 and 4, the gravity of the main body 10 presses onto the hollow flange 412, so that the hollow flange 412 presses against the surface of the resilient member 41, and both ends of the resilient member 41 maintain a specific inclination with the main body 10, and the main body 10 is supported on a flat surface by the supporting plate 411 and the lifting handle 20 so as to achieve the effect of setting the main body 10 still.

In FIGS. 1 and 3, the main body 10 includes a disposing slot 13 disposed on a side opposite to the display screen 11 and away from an end of the lifting handle 20, and a board 14 is separately and pivotally connected to both walls of the disposing slot 13 for gripping the main body 10, and the board 14 can be movably rotated and contained into the disposing slot 13.

Figure 2:
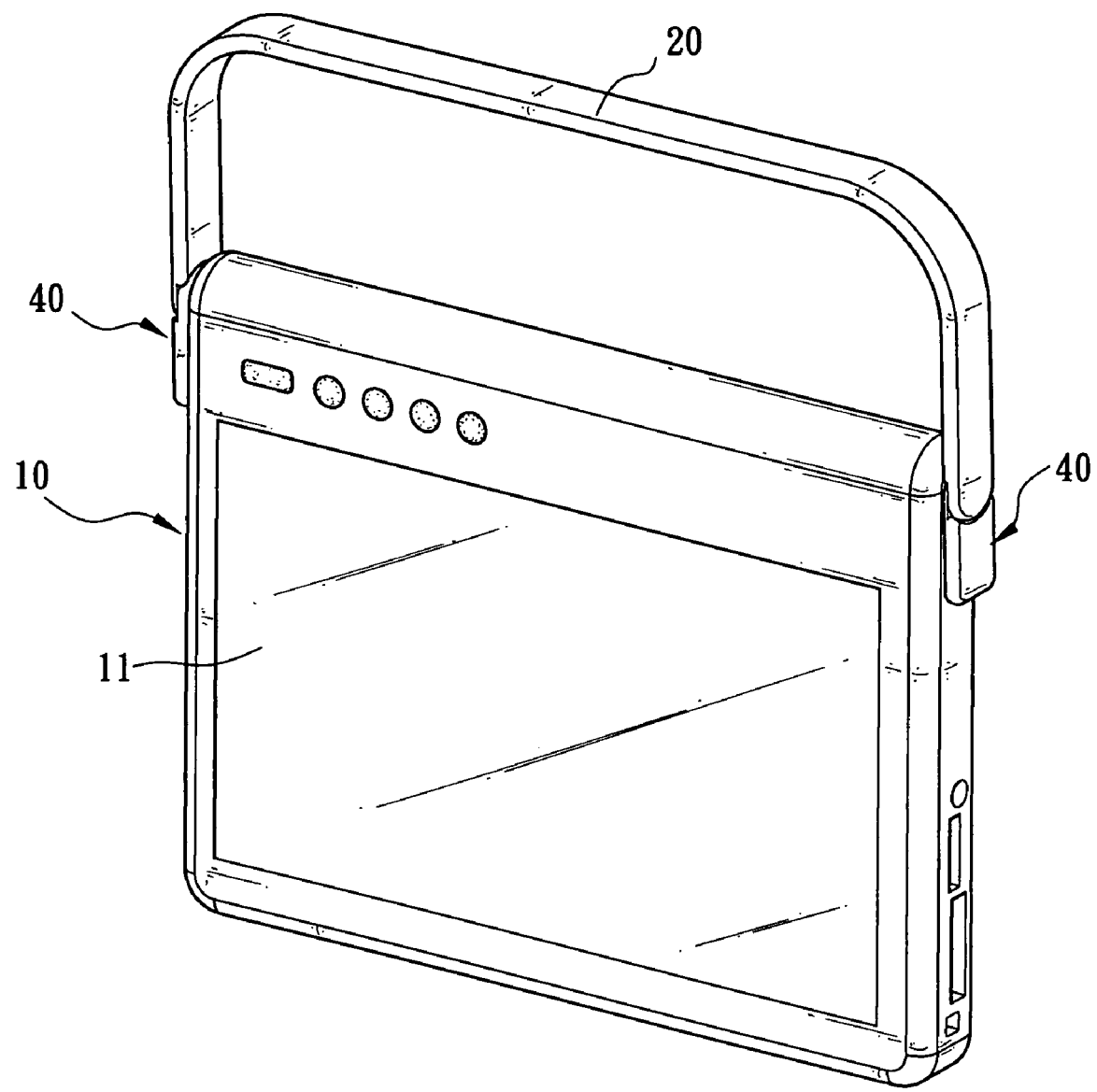
FIG. 2 is a schematic view of another preferred embodiment of the present invention.

In FIGS. 1 and 2, the main body 10 includes at least one detecting device 16 disposed on a lateral side facing the supporting plate 411, and the detecting device 16 can identify whether or not the lifting handle 20 is in the state of hanging the main body 10 according to the detection of the supporting plate 411. If the detecting device 16 detects the supporting plate 411, the detecting device 16 will turn on an image converting device (not shown in the figure) in the main body 10 to turn the angle of the image of the display screen 11 upside down (180 degrees). If the detecting device 16 detects no supporting plate 411, the image converting device will maintain the angle of the original image of the display screen 11.

While the invention herein disclosed has been described by means of specific embodiments, numerous modifications and variations could be made thereto by those skilled in the art without departing from the scope and spirit of the invention set forth in the claims.

What is claimed is:

1. A hanging and desktop dual-purpose computer device, comprising:
   an input device;
   a main body, having a display screen disposed on one side of said main body, and a groove disposed at another side of said main body adjacent to the side having said display screen for accommodating said input device into said main body;
   two pivoting portions, disposed respectively on one end of two opposite sides of said main body adjacent to the sides having said display screen and said groove, and each including a resilient member, a first axle and a second axle, wherein said first axle is in a hollow shape and includes an outwardly extended supporting plate disposed at an end of said first axle for supporting said main body and a hollow flange extended from a hollow circumferential edge of said first axle, said second axle has an end coupled with a depressed hole of said main body and another end including a protruding axle passing through said resilient member and being fixed into said hollow flange, and said resilient member has an end pressing against said hollow flange; and
   a lifting handle, having both ends pivotally coupled to said depressed holes of said main body through said two pivoting portions, and having a protruded connecting edge at each end thereof for coupling with another end of said resilient member, so that said lifting handle can be movably rotated on said two opposite sides of said main body, and said lifting handle can be rotated towards the end of said two opposite sides of said main body to support said main body on a flat surface.

2. The computer device of claim 1, wherein said main body includes a disposing slot disposed on a side opposite to said display screen and at an end away from said lifting handle, and a board is pivotally coupled to both walls of said disposing slot for gripping said main body, and said board can be movably rotated and accommodated in said disposing slot.

3. The computer device of claim 2, wherein said main body comprises at least one detecting device disposed on a lateral side facing said supporting plate, and said detecting device turns the angle of an image of said display screen upside down when said supporting plate is detected by said detecting device.

4. The computer device of claim 3, wherein said main body is a table PC.

5. The computer device of claim 3, wherein said lifting handle is in a U-shape.

6. The computer device of claim 3, wherein said input device is a wireless keyboard.

7. The computer device of claim 3, wherein said resilient member is in a Ω-shape.

8. The computer device of claim 3, wherein said two pivoting portions are rotated along with said lifting handle so as to rotate said supporting plates to positions aligning with axes of the corresponding ends of the said lifting handle.

* * * * *